United States Patent
Lee et al.

(10) Patent No.: US 9,768,944 B2
(45) Date of Patent: Sep. 19, 2017

(54) METHOD FOR COUNTING A DRX (DISCONTINUOUS RECEPTION) TIMER IN A CARRIER AGGREGATION SYSTEM AND A DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 106 days.

(21) Appl. No.: 14/639,827

(22) Filed: Mar. 5, 2015

(65) Prior Publication Data
US 2015/0263846 A1    Sep. 17, 2015

Related U.S. Application Data

(60) Provisional application No. 61/951,474, filed on Mar. 11, 2014.

(51) Int. Cl.
| | | |
|---|---|---|
| H04J 3/00 | (2006.01) | |
| H04L 5/26 | (2006.01) | |
| H04W 76/04 | (2009.01) | |
| H04W 72/12 | (2009.01) | |

(Continued)

(52) U.S. Cl.
CPC .............. *H04L 5/26* (2013.01); *H04L 5/001* (2013.01); *H04L 5/1469* (2013.01);
(Continued)

(58) Field of Classification Search
None
See application file for complete search history.

(56) References Cited

U.S. PATENT DOCUMENTS

| | | | |
|---|---|---|---|
| 2012/0281600 A1 | 11/2012 | Tseng et al. | |
| 2014/0029459 A1* | 1/2014 | Kwon | H04W 76/048 370/252 |

(Continued)

FOREIGN PATENT DOCUMENTS

| | | |
|---|---|---|
| RU | 2012120621 | 1/2014 |
| WO | 2013/115695 | 8/2013 |
| WO | 2013/138782 | 9/2013 |

OTHER PUBLICATIONS

3rd Generation Partnership Project (3GPP), "Technical Specification Group Radio Access Network; Evolved Universal Terrestrial Radio Access (E-UTRA); Medium Access Control (MAC) protocol specification (Release 11)," 3GPP TS 36.321 V11.2.0, XP-50692243, Mar. 2013, 56 pages.

(Continued)

*Primary Examiner* — Edan Orgad
*Assistant Examiner* — Rebecca Song
(74) *Attorney, Agent, or Firm* — Lee, Hong, Degerman, Kang & Waimey PC

(57) ABSTRACT

The present invention relates to a wireless communication system. More specifically, the present invention relates to a method and a device for counting a DRX (Discontinuous Reception) timer in a carrier aggregation system, the method comprising: configuring a plurality of cells including at least one FDD (Frequency Division Duplex) serving cell and at least one TDD (Time Division Duplex) serving cell; and counting a DRX timer in a subframe, wherein the subframe is an uplink subframe for all TDD serving cells.

8 Claims, 10 Drawing Sheets

(51) Int. Cl.
*H04W 76/06* (2009.01)
*H04L 5/14* (2006.01)
*H04L 5/00* (2006.01)

(52) U.S. Cl.
CPC ... *H04W 72/1284* (2013.01); *H04W 72/1289* (2013.01); *H04W 76/048* (2013.01); *H04W 76/068* (2013.01); *H04L 5/0098* (2013.01)

(56) References Cited

U.S. PATENT DOCUMENTS

| | | | | |
|---|---|---|---|---|
| 2014/0307593 A1* | 10/2014 | Zhao | ................... | H04W 72/02 370/278 |
| 2015/0003304 A1* | 1/2015 | Wu | ................... | H04L 1/1854 370/280 |
| 2015/0271837 A1* | 9/2015 | Larsson | ................... | H04L 1/1861 370/329 |

OTHER PUBLICATIONS

3rd Generation Partnership Project (3GPP), "Technical Specification Group Radio Access Network; Study on LTE TDD-FDD joint operation including Carrier Aggregation (Release 12)," 3GPP TR 36.847 V2.0.0, XP-50751505, Dec. 2013, 9 pages.

European Patent Office Application Serial No. 15157915.8, Search Report dated Aug. 7, 2015, 10 pages.

Huawei, et al., "Restriction on combinations of FDD/TDD serving cells for TDD-FDD CA," 3GPP TSG RAN WG1 Meeting #75, R1-135026, Nov. 2013, 3 pages.

PCT International Application No. PCT/KR2015/002124, Written Opinion of the International Searching Authority dated Jun. 9, 2015, 15 pages.

Russian Federation Federal Service for Intellectual Property, Patents and Trademarks Application Serial No. 2016131032/07, Office Action dated Apr. 28, 2017, 10 pages.

* cited by examiner

FIG. 3
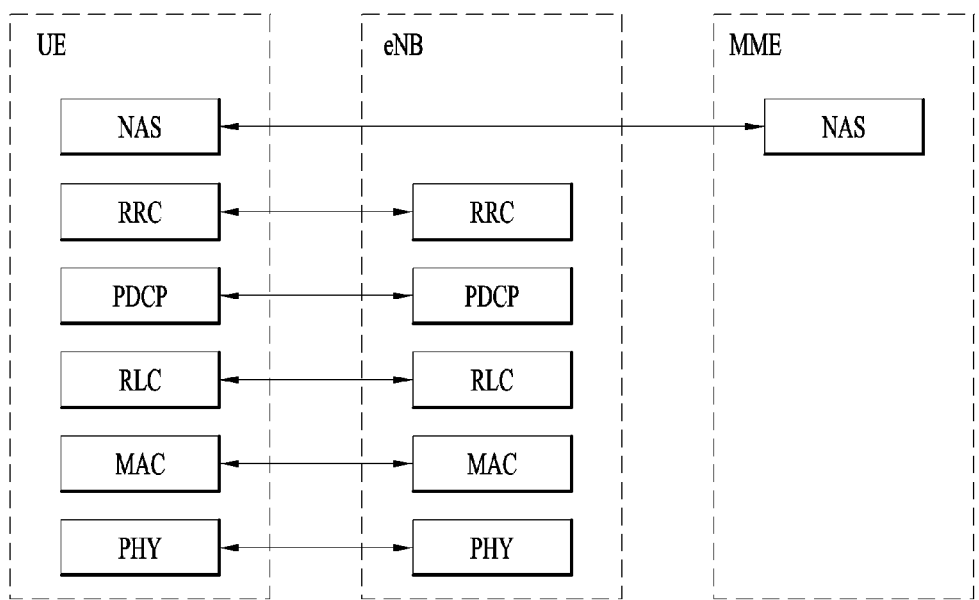
(a) Control-Plane Protocol Stack
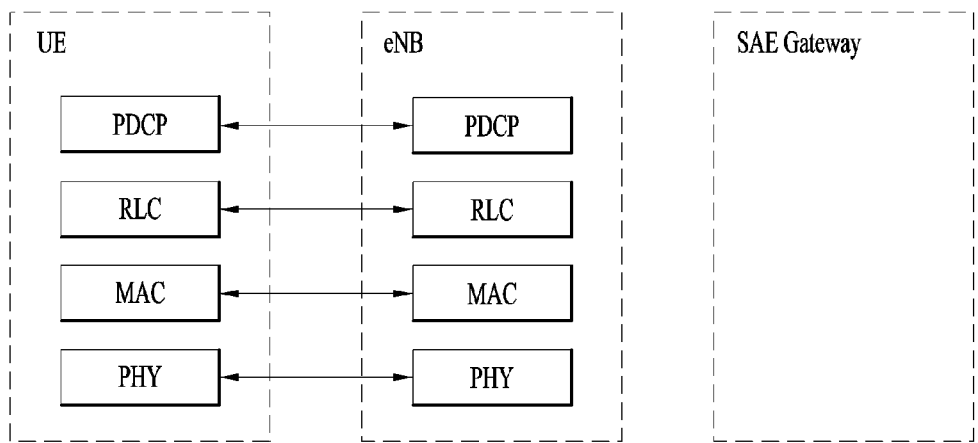
(b) User-Plane Protocol Stack 5 component carriers → 100 MHz

| PCell | F | F | F | F | F | F | F | F | F | F |
|---|---|---|---|---|---|---|---|---|---|---|
| SCell1 | F | F | F | F | F | F | F | F | F | F |
| PDCCH-subframe | Y | Y | Y | Y | Y | Y | Y | Y | Y | Y |
| PDCCH monitoring on PCell | Y | Y | Y | Y | Y | Y | Y | Y | Y | Y |
| PDCCH monitoring on SCell1 | Y | Y | Y | Y | Y | Y | Y | Y | Y | Y |
| DRX Timer counting | Y | Y | Y | Y | Y | Y | Y | Y | Y | Y |

| PCell | D | S | U | U | D | D | D | D | S | U |
|---|---|---|---|---|---|---|---|---|---|---|
| SCell1 | D | S | U | U | U | U | U | D | D | D |
| PDCCH-subframe | Y | Y | NO | NO | Y | Y | Y | Y | Y | Y |
| PDCCH monitoring on PCell | Y | Y | NO | NO | Y | Y | Y | Y | Y | NO |
| PDCCH monitoring on SCell1 | Y | Y | NO | NO | NO | NO | Y | Y | Y | Y |
| DRX Timer counting | Y | Y | NO | NO | Y | Y | Y | Y | Y | Y |

FIG. 11

| PCell | F | F | F | F | F | F | F | F | F | F |
|---|---|---|---|---|---|---|---|---|---|---|
| SCell1 | D | S | U | U | D | S | U | D | S | U |
| SCell2 | U | U | U | U | D | D | D | S | S | S |
| Union of TDD serving cells | NU | NU | U | U | NU | NU | NU | NU | NU | NU |
| PDCCH monitoring on PCell | Y | Y | Y | Y | Y | Y | Y | Y | Y | Y |
| PDCCH monitoring on SCell1 | Y | Y | NO | NO | Y | Y | NO | Y | Y | NO |
| PDCCH monitoring on SCell2 | NO | NO | NO | NO | Y | Y | Y | Y | Y | Y |
| PDCCH-subframe | Y | Y | Y | Y | Y | Y | Y | Y | Y | Y |

FIG. 12

| subframe index | 0 | 1 | 2 | 3 | 4 | 5 | 6 | 7 | 8 | 9 |
|---|---|---|---|---|---|---|---|---|---|---|
| PCell | D | S | U | U | D | S | U | D | S | U |
| SCell1 | F | F | F | F | F | F | F | F | F | F |
| SCell2 | U | U | U | U | D | D | D | S | S | S |
| Union of TDD serving cells | NU | NU | U | U | NU | NU | NU | NU | NU | NU |
| PDCCH monitoring on PCell | Y | Y | NO | NO | Y | Y | NO | Y | Y | NO |
| PDCCH monitoring on SCell1 | Y | Y | Y | Y | Y | Y | Y | Y | Y | Y |
| PDCCH monitoring on SCell2 | NO | NO | NO | NO | Y | Y | Y | Y | Y | Y |
| PDCCH-subframe | Y | Y | Y | Y | Y | Y | Y | Y | Y | Y |

METHOD FOR COUNTING A DRX (DISCONTINUOUS RECEPTION) TIMER IN A CARRIER AGGREGATION SYSTEM AND A DEVICE THEREFOR

CROSS REFERENCE TO RELATED APPLICATIONS

Pursuant to 35 U.S.C. §119(e), this application claims the benefit of U.S. Provisional Patent Application Ser. No. 61/951,474, filed on Mar. 11, 2014, the contents of which are hereby incorporated by reference herein in its entirety.

TECHNICAL FIELD

The present invention relates to a wireless communication system and, more particularly, to a method for counting a DRX (Discontinuous Reception) timer in a carrier aggregation system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for counting a DRX (Discontinuous Reception) timer in a carrier aggregation system. The technical problems solved by the present invention are not limited to the above technical problems and those skilled in the art may understand other technical problems from the following description.

Technical Solution

The object of the present invention can be achieved by providing a method for a User Equipment (UE) operating in a wireless communication system, the method comprising: configuring a plurality of cells including at least one FDD (Frequency Division Duplex) serving cell and at least one TDD (Time Division Duplex) serving cell; and counting a DRX timer in a subframe, wherein the subframe is an uplink subframe for all TDD serving cells.

In another aspect of the present invention, provided herein is a UE (User Equipment) for counting a DRX timer in a wireless communication system, the UE comprising: an RF (Radio Frequency) module; and a processor configured to control the RF module, wherein the processor is configured to configure a plurality of cells including at least one FDD (Frequency Division Duplex) serving cell and at least one TDD (Time Division Duplex) serving cell, to count a DRX (Discontinuous Reception) timer in a subframe, wherein the subframe is an uplink subframe for all TDD serving cells.

Preferably, the DRX timer comprises at least one of a drx-Inactivity timer, a drx-Retransmission timer or an onDuration timer.

Preferably, the DRX timer is counted in the subframe when the subframe is downlink subframe and subframe including DwPTS of at least one of the plurality of cells.

Preferably, all subframes for FDD serving cells including the subframe are downlink subframes and all FDD serving cells are not configured with schedulingCellId.

Preferably, the all TDD serving cells are not configured with schedulingCellId.

It is to be understood that both the foregoing general description and the following detailed description of the present invention are exemplary and explanatory and are intended to provide further explanation of the invention as claimed.

Advantageous Effects

According to the present invention, counting a DRX (Discontinuous Reception) timer can be efficiently performed in a carrier aggregation system. Specifically, the UE can count the DRX timer in TDD-FDD joint operation.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard;

FIGS. 11 and 12 are examples for counting a DRX timer in a carrier aggregation system according to embodiments of the present invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
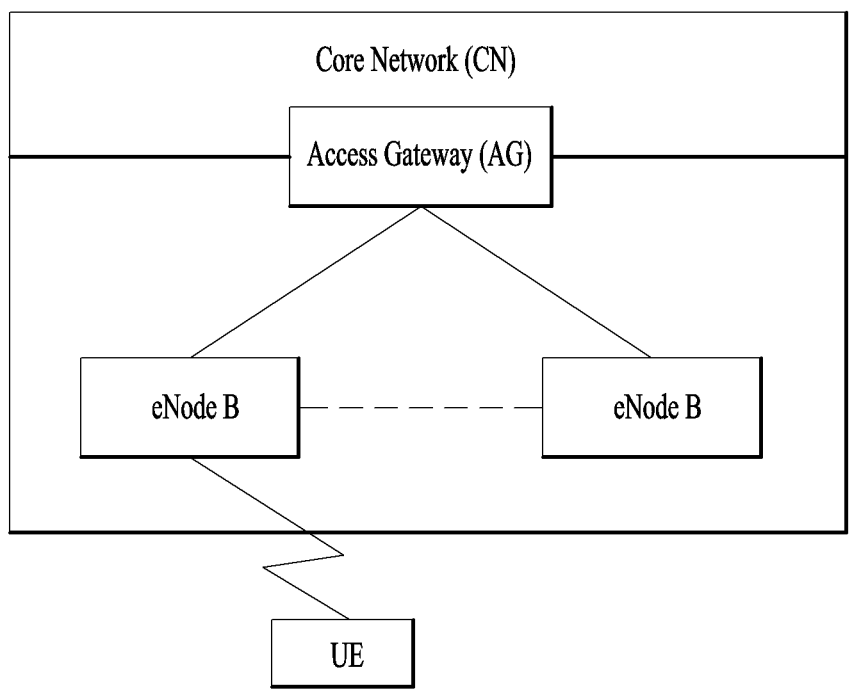
FIG. 1 is a diagram showing a network structure of an Evolved Universal Mobile Telecommunications System (E-UMTS) as an example of a wireless communication system.
Figure 2A:
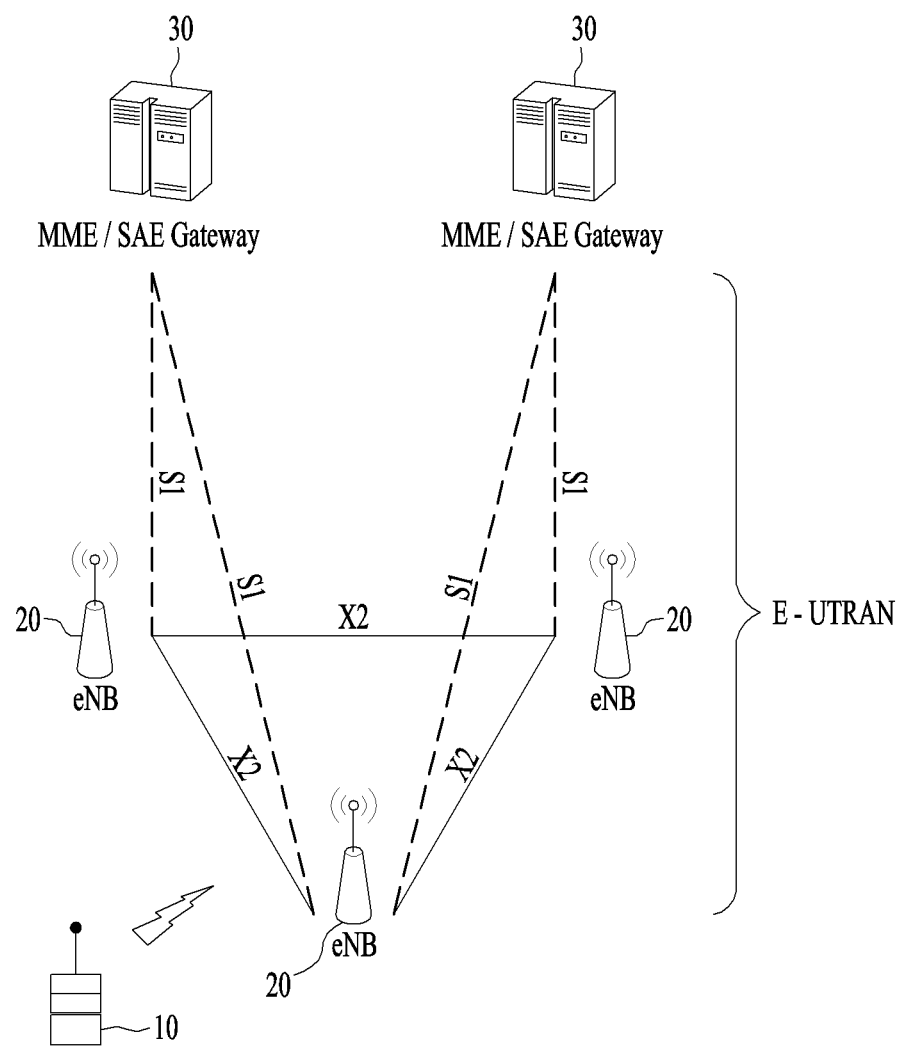
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
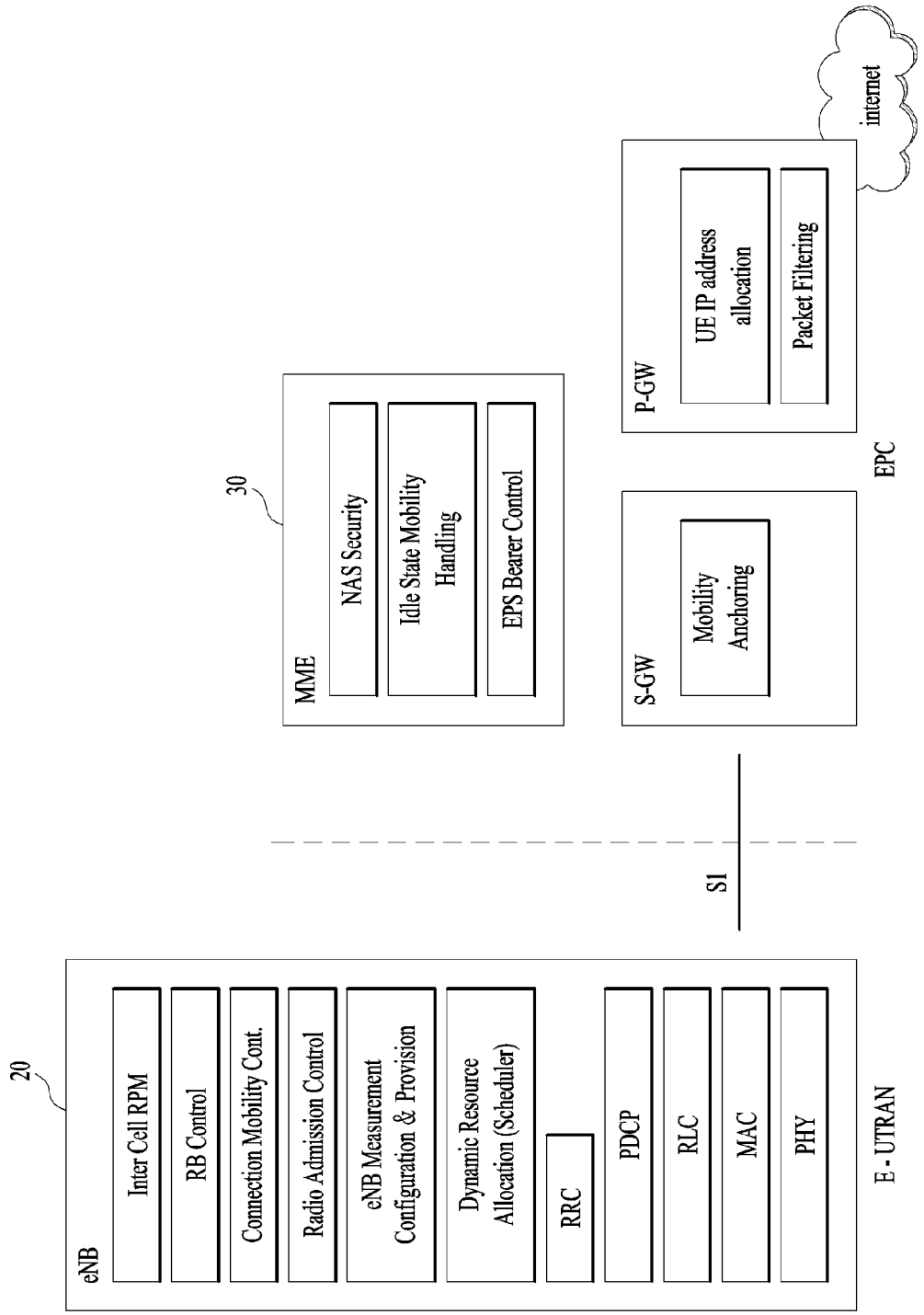
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
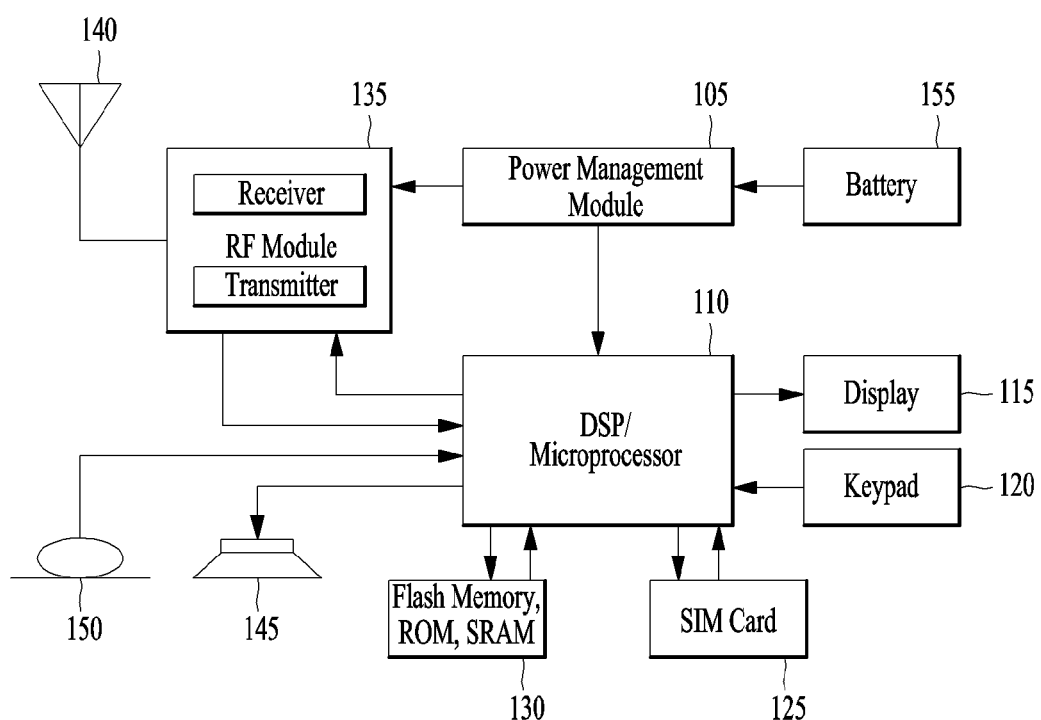
FIG. 4 is a block diagram of a communication apparatus according to an embodiment of the present invention.

FIG. 4 is a block diagram of a communication apparatus according to an embodiment of the present invention.

The apparatus shown in FIG. 4 can be a user equipment (UE) and/or eNB adapted to perform the above mechanism, but it can be any apparatus for performing the same operation.

As shown in FIG. 4, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 4 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 4 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

Figure 5:
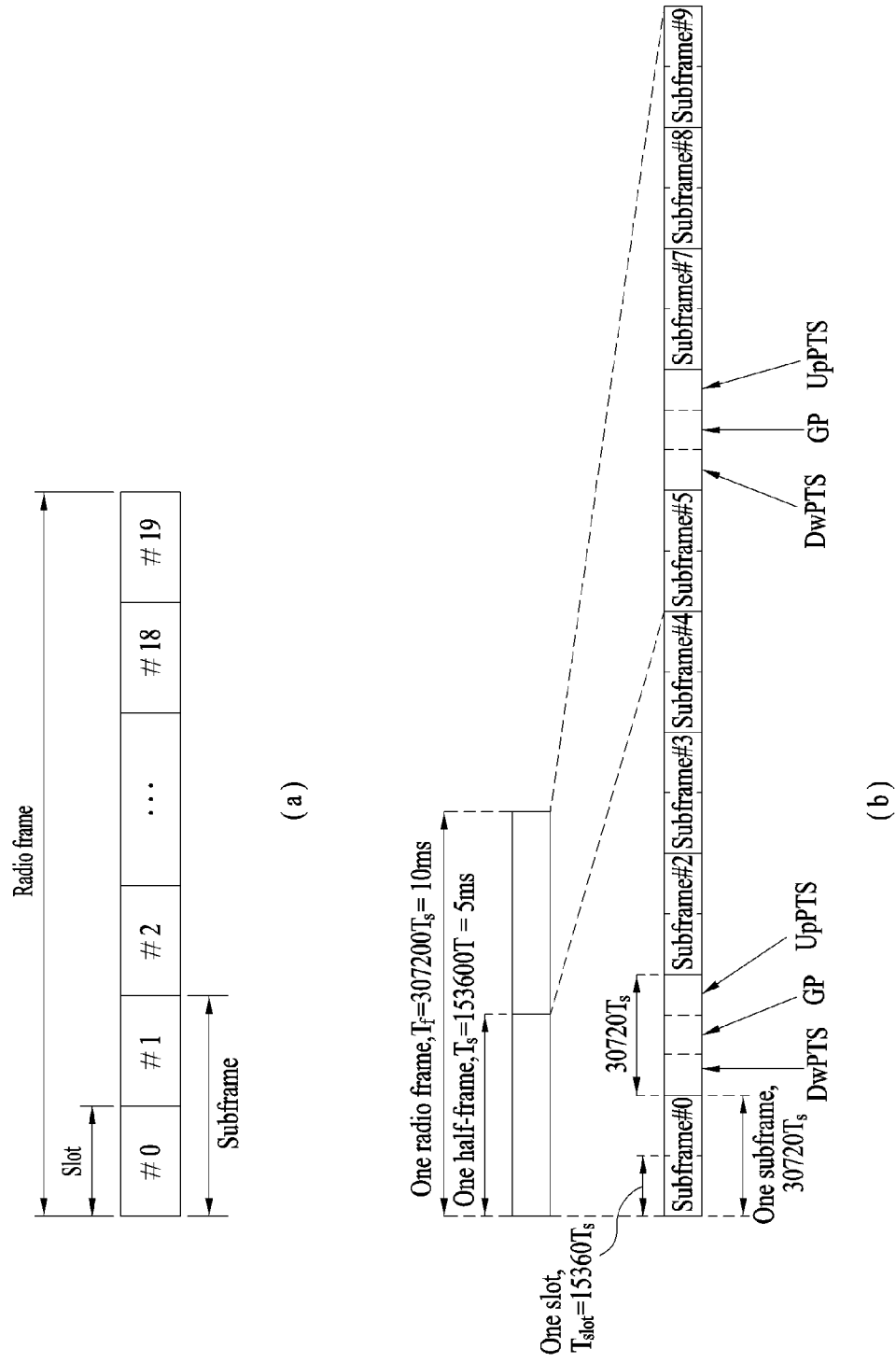
FIG. 5 is a diagram for a radio frame structure.

FIG. 5 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. LTE(-A) supports a type-1 radio frame structure applicable to FDD (frequency division duplex) and a type-2 radio frame structure applicable to TDD (time division duplex).

FIG. 5(*a*) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in LTE(-A), an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. When an OFDM symbol is configured with the normal CP, for example, the number of OFDM symbols included in one slot may be 7. When an OFDM symbol is configured with the extended CP, the number of OFDM symbols included in one slot may be 6.

FIG. 5(b) illustrates a type-2 radio frame structure. The type-2 radio frame includes 2 half frames. Each half frame includes 5 subframes each of which consists of 2 slots.

Table 1 shows UL-DL (uplink-downlink) configurations of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe.

The special subframe includes DwPTS (downlink pilot timeslot), GP (guard period), and UpPTS (uplink pilot timeslot). DwPTS is a period reserved for downlink transmission and UpPTS is a period reserved for uplink transmission.

Table 2 shows DwPTS/GP/UpPTS lengths according to special subframe configuration. In Table 2, Ts denotes sampling time.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The radio frame structure is merely exemplary and the number of subframes included in the radio frame, the number of slots included in a subframe, and the number of symbols included in a slot can be vary.

Figure 6:
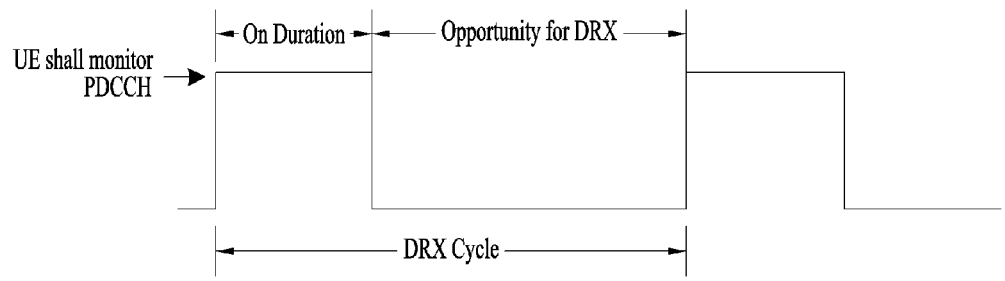
FIG. 6 is a diagram showing a concept DRX (Discontinuous Reception) operation.

FIG. 6 is a diagram showing a concept DRX (Discontinuous Reception) operation.

Referring to FIG. 6, if DRX is set for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-InactivityTimer or a retransmission managing timer, drx-RetransmissionTimer as well as an On Duration managing timer, onDurationTimer is running.

The value of each of the timers is defined as the number of subframes. The number of subframes is counted until the value of a timer is reached. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) onDurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

Figure 7:
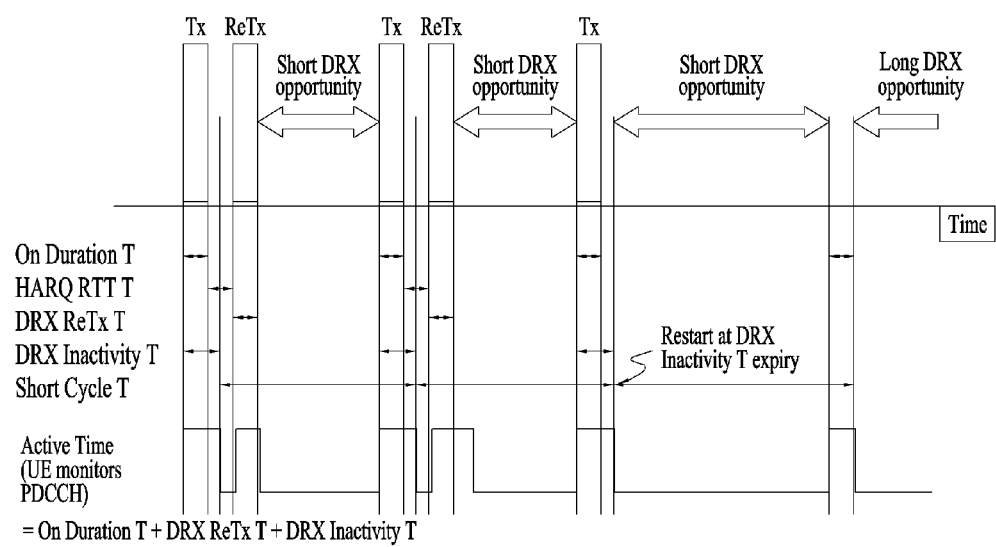
FIG. 7 is a diagram showing a method for a DRX operation in the LTE system.

FIG. 7 is a diagram showing a method for a DRX operation in the LTE system.

Referring to FIG. 7, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop onDurationTimer and drx-InactivityTimer. The DRX Command MAC CE is a command for shifting to a DRX state, and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer, and use the Short DRX Cycle. However, if the Short DRX cycle is not configured, the Long DRX cycle is used. Additionally, if drxShortCycleTimer expires in this subframe, the Long DRX Cycle is also used.

In the current MAC specification, when DRX functionality is configured for the UE, the UE checks, in each subframe, whether to start onDurationTimer as follows:

If the Short DRX Cycle is used and [(SFN*10)+
  subframe number]modulo (shortDRX-Cycle) is
  (drxStartOffset) modulo (shortDRX-Cycle), or If the Long DRX Cycle is used and [(SFN*10)+
  subframe number]modulo (longDRX-Cycle) is
  drxStartOffset, the UE shall start onDuration-
  Timer.                                              [Equation A]

According to the equation A (so-called, modulo-DRX Cycle check), the On Duration appears once per one DRX cycle because it is assumed that the length of DRX cycle is shorter than the maximum SFN value, i.e., the maximum SFN value is currently at most 1023, and the DRX cycle is at most 2560 subframes. If the DRX cycle is set to longer than the 'maximum SFN value*10', e.g., 10230 subframes, in order to further reduce the UE's power consumption, On Duration would appear several times within one DRX cycle.

The UE shall monitor the PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL or UL) new transmission, the UE shall start or restart drx-InactivityTimer.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe. For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Meanwhile, when not in Active Time, the UE does not perform a SRS (Sounding Reference Signal) transmission and a CSI reporting, which are triggered by the eNB.

During the above DRX operation, only the HARQ RTT Timer is fixed to 8 ms, whereas the eNB indicates the other timer values, onDurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

Figures 8, 9A:
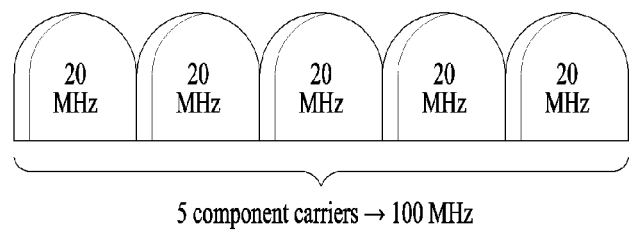
FIG. 8 is a diagram for carrier aggregation.
FIG. 9A is an example of a table for FDD UE operation and FIG. 9B is an example of a table for TDD UE operation.

FIG. 8 is a diagram for carrier aggregation.

Carrier aggregation technology for supporting multiple carriers is described with reference to FIG. 8 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

A subframe configuration is defined for the case that the UE is configured with multiple cells where some of the configured cells are operated in TDD mode while the other cells are operated in FDD mode. (We call it TDD-FDD joint operation.)

For FDD P-cell case, for DL cross-carrier scheduling with PUCCH on PCell-only, the DL HARQ timing of the scheduled serving cell follows the PCell's timing. And if the scheduling serving cell is FDD and the scheduled serving cell is TDD, for UL cross-carrier scheduling, the scheduling/HARQ timing of TDD scheduled serving cell follows the TDD scheduled serving cell's UL/DL configuration. If the scheduling serving cell is TDD and the scheduled serving cell is FDD, for UL cross-carrier scheduling, the scheduling/HARQ timing of FDD scheduled serving cell follows: i) 10 ms RTT, ii) 4 ms between UL grant/PHICH and PUSCH, and iii) Ems between PUSCH and PHICH.

If TDD Pcell self-scheduling is supported, for TDD Pcell case, for DL DL cross-carrier scheduling with PUCCH on PCell-only, the DL HARQ timing of the scheduled serving cell follows the PCell's timing. And PCell's timing is defined as DL HARQ timing determined according to the PCell's SIB1 UL/DL configuration, or DL-reference HARQ timing of the PCell.

For UL cross carrier scheduling if the scheduling serving cell is FDD and the scheduled serving cell is TDD, for UL cross-carrier scheduling, the scheduling/HARQ timing of TDD scheduled serving cell follows the TDD scheduled serving cell's UL/DL configuration. For UL cross carrier scheduling if the scheduling serving cell is TDD and the scheduled serving cell is FDD, for UL cross-carrier scheduling, the scheduling/HARQ timing of FDD scheduled serving cell follows: i) 10 ms RTT, ii) 4 ms between UL grant/PHICH and PUSCH and iii) Ems between PUSCH and PHICH.

Figures 9B, 10:
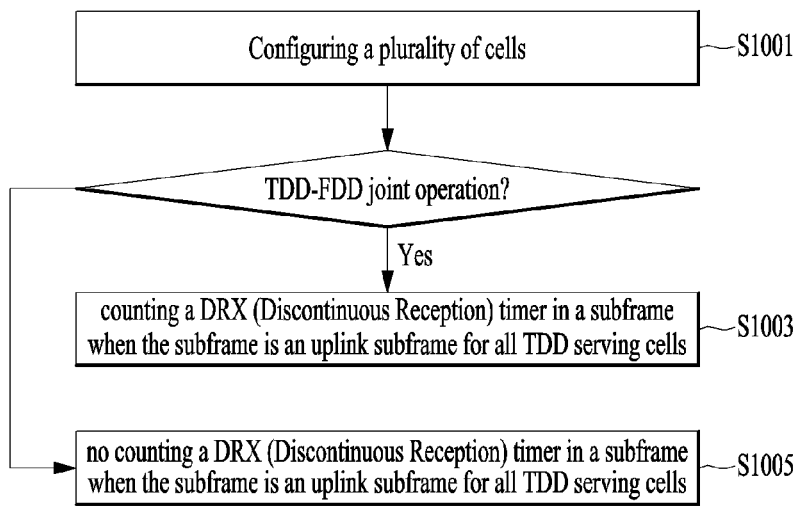
FIG. 10 is a conceptual diagram for counting a DRX timer in a carrier aggregation system according to embodiments of the present invention.

FIG. 9A is an example of a table for FDD UE operation and FIG. 9B is an example of a table for TDD UE operation.

The terms used in the specification are described.
'F'=FDD subframe;
'D'=TDD downlink subframe;
'U'=TDD uplink subframe;
'S'=TDD subframes including DwPTS;
'NU'=Non-Uplink subframe, i.e., D or S for at least one TDD serving cell;
'Y'=Yes; and
'NO'=No.

In the MAC specification, PDCCH-subframe refers to a subframe with PDCCH, which means the subframe that does not carry PDCCH is not PDCCH-subframe. In PDCCH-subframe, the UE monitors PDCCH during Active Time. PDCCH-subframe is also used for counting the timers related to DRX operation such as drx-InactivityTimer, drx-RetransmissionTimer, and onDurationTimer. Since monitoring PDCCH behaviour and DRX operation affect UE's battery consumption, PDCCH-subframe should be defined so that the UE monitors PDCCH only when needed.

Currently, PDCCH-subframe is defined for the UE operating in either FDD mode or TDD mode. For the UE operating in TDD mode, PDCCH-subframe is defined including the cases where the UE is configured with multiple cells that have different TDD UL/DL configurations.

Regarding FIG. 9A, for FDD UE operation, PDCCH-subframe represents any subframe. Hence, the UE monitors all subframes and counts DRX timer in all subframes. When PDCCH monitoring, if the UE is half-duplex, the UE does not monitor PDCCH in a subframe where there is an uplink transmission, but counts DRX Timers.

Regarding FIG. 9B, for TDD UE operation, PDCCH-subframe represents the union of downlink subframes and subframes including DwPTS of all serving cells, except serving cells that are configured with schedulingCellId (that is, the Scheduled cell). The UE does not monitor PDCCH in a subframe where all configured SCells are uplink subframe, and the UE does not count DRX timers in a subframe where all configured SCells are uplink subframe.

However, PDCCH-subframe is not defined yet for the case that the UE is configured with multiple cells where some of the configured cells are operated in TDD mode while the other cells are operated in FDD mode. (so-called, TDD-FDD joint operation.) As UE's PDCCH monitoring and DRX operation are based on PDCCH-subframe, the UE behavior regarding PDCCH monitoring and DRX operation are not clear for TDD-FDD joint operation unless PDCCH-subframe is not defined for this case.

FIG. 10 is a conceptual diagram for counting a DRX timer in a carrier aggregation system according to embodiments of the present invention.

In this invention, when a UE is configured with at least two cells, if the UE is operated in TDD-FDD joint operation on the first cell and TDD-FDD joint operation on the second cell, PDCCH-subframe, PDCCH monitoring behavior, and DRX timer counting are newly defined.

For TDD-FDD joint operation, PDCCH-subframe represents any subframe if the UE is configured with at least one FDD serving cell that is not configured with schedulingCellId. Else if all FDD serving cells configured for the UE are configured with schedulingCellId, this represents union of downlink subframes and subframes including DwPTS of all TDD serving cells, except TDD serving cells that are configured with schedulingCellId.

In other words, for a MAC entity configured with only FDD serving cell(s), this represents any subframe; for a MAC entity configured with at least one TDD serving cell, if a MAC entity is capable of simultaneous reception and transmission in the aggregated cells, this represents the union over all serving cells of downlink subframes and subframes including DwPTS of the TDD UL/DL configuration indicated by tdd-Config, except serving cells that are configured with schedulingCellId (that is a Scheduled cell); otherwise, this represents the subframes where the SpCell is configured with a downlink subframe or a subframe including DwPTS of the TDD UL/DL configuration indicated by tdd-Config.

Based on PDCCH-subframe defined above, i) Active Time is time related to DRX operation during which the UE monitors the PDCCH in PDCCH-subframes, ii) drx-InactivityTimer specifies the number of consecutive PDCCH-subframe(s) after the subframe in which a PDCCH indicates an initial UL or DL user data transmission for the UE, iii) drx-RetransmissionTimer specifies the maximum number of consecutive PDCCH-subframe(s) until a DL retransmission is received, and iv) onDurationTimer specifies the number of consecutive PDCCH-subframe(s) at the beginning of a DRX Cycle.

Preferably, the DRX timer comprises a drx-Inactivity timer, a drx-Retransmission timer and an onDuration timer.

When the UE may configure a plurality of cells including at least one FDD serving cell and at least one TDD serving cell (S1001), the UE counts a DRX timer in a subframe (S1003).

Preferably, the subframe is an uplink subframe for all TDD serving cells. If the plurality of cells consist of all TDD serving cells, the UE doesn't count the DRX timer in a subframe when the subframe is an uplink subframe for all TDD serving cells (S1005).

Preferably, if the UE configures TDD-FDD joint operation, the subframe in which the UE counts the DRX timer is one of union of downlink subframes and subframes including DwPTS of all serving cells. And all subframes for FDD serving cell are considered as downlink subframes.

Preferably, the all TDD serving cells are not configured with schedulingCellId. That is the all TDD serving cell is not scheduled cells. Also, all FDD serving cells are not configured with schedulingCellId. That is the all FDD serving cell is not scheduled cells FIGS. 11 and 12 are examples for counting a DRX timer in a carrier aggregation system according to embodiments of the present invention.

In the example below only considers a serving cell not configured with schedulingCellId, i.e., PDCCH of the serving cell is received on the serving cell.

FIG. 11 represents an example for PCell is configured with FDD mode, and SCell1 and SCell2 are configured with TDD mode.

As mentioned above, a PDCCH-subframe represents any subframe if the UE is configured with at least one FDD serving cell. In this case, because the PCell is FDD serving cell, the PDCCH-subframe represents any subframe. Although third and fourth subframes (subframe index=2, 3) are union of TDD serving cells, the third and fourth subframes are also PDCCH-subframe.

Preferably, the DRX timer comprises at least one of a drx-Inactivity timer, a drx-Retransmission timer or an onDuration timer.

Preferably, because all subframes for FDD serving cell are downlink subframes, the PDCCH-subframe is one of union of downlink subframes and subframes including DwPTS of all serving cells.

Thus, the UE does not monitor PDCCH on TDD serving cell if it is uplink subframe for the TDD serving cell. However, for TDD serving cells, the UE counts DRX timers in a subframe even if the subframe is uplink subframe for the union of TDD serving cells, i.e., even if the UE cannot receive PDCCH on any of TDD serving cells in the subframe.

Meanwhile, if the UE counts the DRX timers in subframes where the UE can receive PDCCH on any of TDD serving cell, PDCCH-subframe may represent union of downlink subframes and subframes including DwPTS of all TDD serving cells. And For FDD serving cell, the UE does not count DRX timers in a subframe even if the UE can receive PDCCH in the subframe. That is, the UE monitors PDCCH in a subframe where the UE can receive PDCCH, in addition to the PDCCH-subframe. In this subframe, the UE does not count DRX timers.

FIG. 12 represents an example for PCell and SCell 2 are configured with TDD mode, and SCell1 is configured with FDD mode.

As mentioned above, a PDCCH-subframe represents any subframe if the UE is configured with at least one FDD serving cell. In this case, because the SCell1 is FDD serving cell, the PDCCH-subframe represents any subframe. Although third and fourth subframes (subframe index=2, 3) are union of TDD serving cells, the third and fourth subframes are also PDCCH-subframe.

Thus, the UE does not monitor PDCCH on TDD serving cell if it is uplink subframe for the TDD serving cell. However, for TDD serving cells, the UE counts DRX timers in a subframe even if the subframe is uplink subframe for the union of TDD serving cells, i.e., even if the UE cannot receive PDCCH on any of TDD serving cells in the subframe.

Meanwhile, if the UE counts the DRX timers in subframes where the UE can receive PDCCH on any of TDD serving cell, PDCCH-subframe may represent union of downlink subframes and subframes including DwPTS of all TDD serving cells. And For FDD serving cell, the UE does not count DRX timers in a subframe even if the UE can receive PDCCH in the subframe. That is, the UE monitors PDCCH in a subframe where the UE can receive PDCCH, in addition to the PDCCH-subframe. In this subframe, the UE does not count DRX timers.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a User Equipment (UE) operating in a wireless communication system, the method comprising:
configuring a plurality of cells including at least one Frequency Division Duplex (FDD) serving cell and at least two Time Division Duplex (TDD) serving cells;
monitoring a Physical Downlink Control Channel (PDCCH) in one of a plurality of subframes which all of the at least two TDD serving cells use for transmitting uplink data when Discontinuous Reception (DRX) is configured; and
receiving the PDCCH in the one of the plurality of subframes which all of the at least two TDD serving cells use for transmitting uplink data.

2. The method according to claim 1, further comprising:
performing a DRX timer by counting the plurality of subframes,
wherein the DRX timer comprises at least one of a drx-Inactivity timer, a drx-Retransmission timer or an onDuration timer.

3. The method according to claim 1, wherein all subframes for the at least one FDD serving cell including the received subframe are downlink subframes, and
all of the at least one FDD serving cell are not configured with a schedulingCellId.

4. The method according to claim 1, wherein all of the at least two TDD serving cells are not configured with a schedulingCellId.

5. A User Equipment (UE) communicating for operating in a wireless communication system, the UE comprising:
a Radio Frequency (RF) module; and
a processor configured to control the RF module,
wherein the processor is configured to:
configure a plurality of cells including at least one Frequency Division Duplex (FDD) serving cell and at least two Time Division Duplex (TDD) serving cells,
monitor a Physical Downlink Control Channel (PDCCH) in one of a plurality of subframes which all of the at least two TDD serving cells use for transmitting uplink data when Discontinuous Reception (DRX) is configured, and
receive the PDCCH in the one of the plurality of subframes which all of the at least two TDD serving cells use for transmitting uplink data.

6. The UE according to claim 5,
wherein the processor is further configured to perform a DRX timer by counting the plurality of subframes, and
wherein the DRX timer comprises at least one of a drx-Inactivity timer, a drx-Retransmission timer or an onDuration timer.

7. The UE according to claim 6, wherein all subframes for the at least one FDD serving cell including the received subframe are downlink subframes, and
all of the at least one FDD serving cell are not configured with a schedulingCellId.

8. The UE according to claim 5, wherein all of the at least two TDD serving cells are not configured with a schedulingCellId.

* * * * *